US005559193A

United States Patent [19]
McGrath et al.

[11] Patent Number: 5,559,193
[45] Date of Patent: Sep. 24, 1996

[54] CONTROLLED FUNCTIONAL DENSITY POLYAMINES AND METHOD FOR PREPARATION THEREOF

[75] Inventors: Martin P. McGrath, Webster Groves; Samuel J. Tremont, Manchester, both of Mo.

[73] Assignee: Monsanto Company, St. Louis, Mo.

[21] Appl. No.: 169,236

[22] Filed: Dec. 20, 1993

[51] Int. Cl.$^6$ .................... C08F 2/00; C08F 8/00; C08F 8/32

[52] U.S. Cl. .................... 525/326.1; 525/326.2; 525/331.9

[58] Field of Search .................... 525/327.6, 327.9, 525/331.9, 333.2, 326.1, 326.2

[56] References Cited

U.S. PATENT DOCUMENTS

| | | |
|---|---|---|
| 3,383,426 | 5/1968 | Cull et al. . |
| 4,068,056 | 1/1978 | Engel et al. . |
| 4,292,242 | 9/1981 | Laine . |
| 4,297,481 | 10/1981 | Jachimowicz et al. . |
| 4,312,965 | 1/1982 | Jachimowicz et al. . |
| 4,503,217 | 3/1985 | Alexander . |
| 4,526,936 | 7/1985 | Jachimowicz et al. . |
| 4,543,411 | 10/1985 | Knifton et al. . |
| 4,558,101 | 12/1985 | Jachimowicz et al. . |
| 4,657,984 | 4/1987 | McEntire et al. . |
| 4,705,898 | 11/1987 | McEntire et al. . |
| 4,794,199 | 12/1988 | Lin et al. . |
| 5,049,625 | 9/1991 | Tazuma et al. . |
| 5,134,200 | 7/1992 | Wideman . |

FOREIGN PATENT DOCUMENTS

457386A2  11/1991  European Pat. Off. .

WO92/01730  2/1992  WIPO .

OTHER PUBLICATIONS

Jachimowicz, F., et al., "Scope and Pathway of Catalytic Aminomethylation of Olefins", *J. Org. Chem.*, 47, 445–47 (Jan. 1982).

Jachimowicz, F., et al, "Aminomethylation of Diene Polymers–Novel Route to Polyamines", Catalysis of Organic Reactions, Chemical Industries/22, Augustine, R. L. (ed.), pp. 381–390 (Sep. 1985).

*Primary Examiner*—Jeffrey Mullis
*Attorney, Agent, or Firm*—Kenneth D. Goetz

[57] ABSTRACT

A process for preparing a polyamine containing a controlled amount of pendant tertiary amine groups and a controlled amount of pendant secondary amine or different tertiary amine groups and reactive carbon-carbon double bonds comprising reductively aminating essentially all aldehyde groups in a polyaldehyde containing a controlled amount of pendant aldehyde groups and reactive carbon-carbon double bonds with a first secondary amine to produce a poly(tertiary amine), hydroformylating the poly(tertiary amine) having a controlled amount of pendant aldehyde groups, and reductively aminating the poly(tertiary amine) with pendant aldehyde groups with a primary amine or a second secondary amine. In another embodiment for preparing the polyamines of the invention, the polyaldehyde is reductively aminated with an amount of a first secondary amine to reductively aminate a controlled amount of the aldehyde groups and further reductively aminated with a primary amine or a second secondary amine to reductively aminate essentially all the remaining aldehyde groups.

30 Claims, No Drawings

CONTROLLED FUNCTIONAL DENSITY POLYAMINES AND METHOD FOR PREPARATION THEREOF

BACKGROUND OF THE INVENTION

This invention relates to controlled functional density polyamines containing olefinic unsaturation. In one aspect, this invention relates to the production of controlled functional density polyamines having controlled amounts of pendant tertiary amine and pendant secondary amine groups. In another aspect, this invention relates to the production of controlled functional density polyamines having controlled amounts of two different pendant tertiary amine groups. In a further aspect, this invention relates to the production of controlled functional density polyamines containing olefinic unsaturation by selective reaction of carbon-carbon double bonds in the starting polymer containing olefinic unsaturation.

The principle of preparing amines by reacting an olefin with hydrogen, carbon monoxide and a primary or secondary amine is known. Various techniques embodying this principle have been described using various catalysts. Such techniques are generally referred to as aminomethylation reactions.

In J. Org. Chem., 47, 445 (1982), Jachimowicz et al disclose various approaches which have been used in attempts to devise a one-step, efficient and general conversion of olefins to amines. Among the catalysts are iron pentacarbonyl, rhodium oxide, ruthenium/iron carbonyl and iridium catalysts.

U.S. Pat. No. 4,297,481 discloses a process for forming a polymeric polyamine/amide wherein said amino/amide nitrogens are positioned in the polymer backbone by contacting a monomeric nitrogen compound which has at least two labile hydrogens bonded to the nitrogen atoms therein, a monomeric hydrocarbon compound containing at least two olefinic groups therein, carbon monoxide and water in the presence of a catalytic amount of a rhodium-containing compound. This invention describes the use of ammonia or primary amines but does not produce polymers with exclusively pendant secondary amine groups nor does it produce polymers wherein the amount of pendant secondary and tertiary amine groups can be controlled. The preparation of polymers with pendant amine and amide groups is described in U.S. Pat. No. 4,312,965. These polymers are prepared from polymeric polyolefins, carbon monoxide, water and nitrogen compounds such as ammonia and primary or secondary amines. Again, rhodium or a rhodium-containing compound serves as the catalyst. However, this invention describes polymers having a low degree of amine incorporation which predominantly contain tertiary amine groups when primary amines are used as the starting material such that the amount of pendant secondary and tertiary amine groups cannot be controlled.

U.S. Pat. No. 4,503,217 teaches a process for preparing polymeric polyamines from polybutadiene, ammonia and primary or secondary amines, carbon monoxide and hydrogen in the presence of a catalyst system comprising a ruthenium-containing catalyst and a dimethylformamide-alkane mixed solvent which provides a two-phase liquid product, allowing for easy separation of the product polyamine. When primary amines are used in this invention, only the vinyl groups are functionalized, the yield for the amine containing polymers are low, and the resulting polymers are insoluble in organic solvents.

U.S. Pat. No. 4,657,984 discloses preparation of polymeric poly(tertiary amines) from carbon monoxide, hydrogen, polymeric olefins and secondary amines utilizing ruthenium or rhodium phosphines as catalysts. It states that use of these particular catalysts facilitates reaction and hence functionalization of internal as well as vinyl olefin groups.

Thus, the state of the art for preparing polymeric secondary and tertiary polyamines teaches an aminomethylation reaction wherein the vinylic olefins and internal olefins can be reacted utilizing various catalysts under a variety of conditions. However, these reactions are significantly different than the reaction sequence of hydroformylation and reductive amination because there is no teaching in the aminomethylation prior art regarding how to control the degree of functionalization, i.e., the functional density, of either the polyaldehyde or the polyamine prepared therefrom, especially the amounts of different amine pendant groups.

A process which produces controlled functional density polyamines containing residual reactive carbon-carbon double bonds which uses milder reaction conditions, results in higher functional density polymers which contain controlled amounts of pendant tertiary amine and pendant secondary amine groups, or controlled amounts of two different pendant tertiary amine groups, and produces polymers which are soluble in organic solvents would be highly desirable.

The polyamines produced by the process of the present invention are useful in rubber chemicals, such as polymer bound cure accelerators which do not release hazardous volatile materials during curing, polymeric co-activators which cannot migrate from one component to another and polymer bound antioxidants and/or antiozonants with significantly lower tendency to leach out of rubber products, e.g., tires. The polyamines having controlled amounts of pendant tertiary amine groups and pendant secondary amine groups produced by the process of the present invention are also useful in urethane/urea materials, coatings, adhesives, sealants and when the polyamine contains pendant secondary amine groups, construction of three dimensional networks through bonds not available to tertiary amines.

SUMMARY OF THE INVENTION

It is an object of the invention to provide a process for preparing controlled functional density polyamines containing olefinic unsaturation. It is a further object of the invention to provide an efficient and commercially viable process for preparing controlled functional density polyamines containing residual reactive carbon-carbon double bonds which uses mild reaction conditions, which results in higher functional density polymers which contain controlled amounts of pendant tertiary and secondary amine groups or controlled amounts of two different tertiary amine groups and essentially no tertiary amine groups derived from pendant secondary amine groups, and are soluble in organic solvents. It is a still further object of the invention to provide a process for preparing controlled functional density polyamines for use in rubber chemical applications such as cure accelerators, polymeric co-activators and antioxidants/antiozonants.

According to the invention, a process for preparing a polyamine containing a controlled amount of pendant tertiary amine groups and a controlled amount of pendant secondary amine or different tertiary amine groups is provided which comprises contacting a polyaldehyde containing a controlled amount of pendant aldehyde groups and reactive carbon-carbon double bonds and a first secondary amine under reductive amination conditions in the presence of (1) hydrogen and a ruthenium-containing imine hydrogenation catalyst or (2) an alkali metal borohydride to produce a poly(tertiary amine) having a substantially equivalent ratio of tertiary amine groups to reactive carbon-carbon double bonds as the ratio of aldehyde groups to reactive carbon-carbon double bonds in the polyaldehyde; contacting the poly(tertiary amine) containing reactive carbon-carbon double bonds with carbon monoxide and hydrogen under hydroformylation conditions in the presence of a hydroformylation catalyst to produce a poly(tertiary amine) containing a controlled amount of aldehyde groups and reactive carbon-carbon double bonds; and reacting the poly(tertiary amine) containing a controlled amount of aldehyde groups and reactive carbon-carbon double bonds and a primary amine or a second secondary amine under reductive amination conditions in the presence of (1) hydrogen and a ruthenium-containing imine hydrogenation catalyst or (2) an alkali metal borohydride to produce the polyamine having a substantially equivalent ratio of secondary amine groups or tertiary amine groups derived from the second secondary amine to reactive carbon-carbon double bonds as the ratio of aldehyde groups to reactive carbon-carbon double bonds in the poly(tertiary amine) containing a controlled amount of aldehyde groups and reactive carbon-carbon double bonds, provided that when the reductive amination of the poly(tertiary amine) containing a controlled amount of aldehyde groups and reactive carbon-carbon double bonds is done with a primary amine in the presence of an alkali metal borohydride, the primary amine is a sterically hindered aliphatic or cycloaliphatic primary amine or an aromatic primary amine. In one embodiment, the reductive aminations are conducted in the presence of carbon monoxide. In another embodiment, the polyaldehyde is produced by contacting a polymer containing olefinic unsaturation with carbon monoxide and hydrogen in the presence of a hydroformylation catalyst. In a further embodiment, the amount of aldehyde groups in the polyaldehyde or the poly(tertiary amine) containing a controlled amount of aldehyde groups and reactive carbon-carbon double bonds is controlled by controlling the consumption of carbon monoxide and hydrogen during the hydroformylation.

Further according to the invention, a process for preparing a polyamine containing a controlled amount of pendent tertiary amine groups and a controlled amount of pendent secondary amine or different tertiary amine groups is provided which comprises contacting a polyaldehyde containing a controlled amount of pendent aldehyde groups and reactive carbon-carbon double bonds and a first secondary amine under reductive amination conditions in the presence of (1) hydrogen and a ruthenium-containing imine hydrogenation catalyst or (2) an alkali metal borohydride, wherein the amount of the first secondary amine is based on the percentage of pendant aldehyde groups to be reductively aminated, to produce a poly(tertiary amine) having a controlled amount of pendant tertiary amine groups, a controlled amount of pendant aldehyde groups, and a controlled amount of reactive carbon-carbon double bonds wherein the ratio of the sum of the pendant tertiary amine groups and pendant aldehyde groups to reactive carbon-carbon double bonds in the poly(tertiary amine) is substantially equivalent to the ratio of pendant aldehyde groups to reactive carbon-carbon double bonds in the polyaldehyde, contacting the poly(tertiary amine) and a primary amine or a second secondary amine under reductive amination conditions in the presence of (1) hydrogen and a ruthenium-containing imine hydrogenation catalyst or (2) an alkali metal borohydride to produce the polyamine having a substantially equivalent ratio of secondary amine groups or tertiary amine groups derived from the second secondary amine to reactive carbon-carbon double bonds as the ratio of aldehyde groups to reactive carbon-carbon double bonds in the poly(tertiary amine), provided that when the reductive amination is done with a primary amine in the presence of an alkali metal borohydride, the primary amine is a sterically hindered aliphatic or cycloaliphatic primary amine or an aromatic primary amine. In one embodiment, the reductive aminations are conducted in the presence of carbon monoxide. In another embodiment, the polyaldehyde is produced by contacting a polymer containing olefinic unsaturation with carbon monoxide and hydrogen in the presence in a hydroformylation catalyst. In a further embodiment, the functional density of the polyaldehyde, i.e. the mole percent of carbon-carbon double bonds in the polymer containing olefinic unsaturation which are hydroformylated to aldehyde groups, is controlled by controlling the consumption of carbon monoxide and hydrogen during the hydroformylation.

Still further according to the invention, a process for preparing a polyamine containing a controlled amount of pendant tertiary amine groups and a controlled amount of pendant secondary amine groups is provided with comprises contacting a polyaldehyde containing a controlled amount of pendant aldehyde groups and carbon-carbon double bonds, a first secondary amine and a primary amine under reductive amination conditions in the presence of (1) hydrogen and a ruthenium-containing imine hydrogenation catalyst or (2) an alkali metal borohydride to produce a poly (secondary/tertiary amine) having a substantially equivalent ratio of the sum of the number of the tertiary amine groups and secondary amine groups to reactive carbon-carbon double bonds as the ratio of aldehyde groups to reactive carbon-carbon double bonds in the polyaldehyde, wherein the molar ratio of the first secondary amine to the primary amine is based on the relative reactivities of the first secondary amine and the primary amine and the desired controlled amounts of pendant tertiary amine and pendant secondary amine groups, provided that when the reductive amination is conducted in the presence of an alkali metal borohydride the primary amine is a sterically hindered aliphatic or cycloaliphatic primary amine or an aromatic primary amine. In one embodiment, the reductive amination is conducted in the presence of carbon monoxide. In another embodiment, the polyaldehyde is produced by contacting a polymer containing olefinic unsaturation with carbon monoxide and hydrogen in the presence of a hydroformylation catalyst. In a further embodiment, the amount of aldehyde groups in the polyaldehyde is controlled by controlling the consumption of carbon monoxide and hydrogen during the hydroformylation.

Still further according to the invention, a polyamine is provided which comprises repeating units derived from the repeating unit of a polymer containing olefinic unsaturation having reactive carbon-carbon double bonds, and repeating units derived from the repeating unit of the same polymer containing olefinic unsaturation which has been hydroformylated and reductively aminated to produce pendant secondary amine and tertiary amine groups wherein the functional density of the polyamine is 2 to about 90 mole percent, the number of repeating units with pendant tertiary amine groups is about 5 to about 95 percent of the sum of the number of repeating units with pendant tertiary and secondary amine groups, provided the number of repeating units with pendant secondary amine groups and repeating units with pendant tertiary amine groups are each at least 1 percent of the sum of the number of repeating units containing reactive carbon-carbon double bonds, and repeating units containing pendant secondary and tertiary amine groups.

Still further according to the invention, a polyamine is provided which comprises repeating units derived from the repeating unit of a polymer containing olefinic unsaturation having reactive carbon-carbon double bonds, and repeating units derived from the repeating unit of the same polymer containing olefinic unsaturation which has been hydroformylated and reductively aminated to produce repeating units having two different tertiary amine groups, wherein the functional density of the polyamine is 2 to about 90 mole percent, and the number of repeating units having pendant tertiary amine groups derived from one of the secondary amines is about 5 to about 95 percent of the sum of the number of repeating units having pendant tertiary amine groups, provided the number of repeating units having pendant tertiary amine groups derived from the first secondary amine and the number of repeating units having pendant tertiary amine groups derived from the second secondary amine are each at least 1 percent of the sum of the number of repeating units containing olefinic unsaturation having reactive carbon-carbon double bonds, and repeating units having pendant tertiary amine groups.

DETAILED DESCRIPTION OF THE INVENTION

A first embodiment of the invention relates to a process for preparing a polyamine containing a controlled amount of pendant tertiary amine groups and a controlled amount of pendant secondary amine or different tertiary amine groups comprising:

(a) contacting a polyaldehyde containing a controlled amount of pendant aldehyde groups and reactive carbon-carbon double bonds and a first secondary amine under reductive amination conditions in the presence of (1) hydrogen and a ruthenium-containing imine hydrogenation catalyst or (2) an alkali metal borohydride to produce a poly(tertiary amine) having a substantially equivalent ratio of tertiary amine groups to reactive carbon-carbon double bonds as the ratio of aldehyde groups to reactive carbon-carbon double bonds in the polyaldehyde, (b) contacting the poly(tertiary amine) containing reactive carbon-carbon double bonds with carbon monoxide and hydrogen under hydroformylation conditions in the presence of a hydroformylation catalyst to produce a poly(tertiary amine) containing a controlled amount of aldehyde groups and reactive carbon-carbon double bonds, and (c) reacting the poly(tertiary amine) containing a controlled amount of aldehyde groups and reactive carbon-carbon double bonds and a primary amine or a second secondary amine under reductive amination conditions in the presence of (1) hydrogen and a ruthenium-containing imine hydrogenation catalyst or (2) an alkali borohydride to produce the polyamine having a substantially equivalent ratio of secondary amine groups or tertiary amine groups derived from the second secondary amine to reactive carbon-carbon double bonds as the ratio of aldehyde groups to reactive carbon-carbon double bonds in the poly(tertiary amine) containing a controlled amount of aldehyde groups and reactive carbon-carbon double bonds, provided that when the reductive amination of (c) is done with a primary amine in the presence of an alkali metal borohydride, the primary amine is a sterically hindered aliphatic or cycloaliphatic primary amine or an aromatic primary amine.

According to the process of the first embodiment of the invention, the polyaldehyde of (a) is produced by contacting a polymer containing olefinic unsaturation with carbon monoxide and hydrogen in the presence of a hydroformylation catalyst. In addition, the reductive amination of (a) or (c) can optionally be conducted in the presence of carbon monoxide when the reductive amination is conducted in the presence of hydrogen and a ruthenium-containing imine hydrogenation catalyst. When carbon monoxide is present during the reductive amination, the molar ratio of carbon monoxide to hydrogen is less than about 0.15:1, preferably less than about 0.1:1, and most preferably less than about 0.05:1.

A second embodiment of the invention relates to a process for preparing a polyamine containing a controlled amount of pendant tertiary amine groups and a controlled amount of pendant secondary amine or different tertiary amine groups comprising: (a) contacting a polyaldehyde containing a controlled amount of pendant aldehyde groups and reactive carbon-carbon double bonds and a first secondary amine under reductive amination conditions in the presence of (1) hydrogen and ruthenium-containing imine hydrogenation catalyst or (2) an alkali metal borohydride, wherein the amount of the first secondary amine is based on the percentage of pendant aldehyde groups to be reductive aminated, to produce a poly(tertiary amine) having a controlled amount of pendant tertiary amine groups, a controlled amount of pendant aldehyde groups, and a controlled amount of reactive carbon-carbon double bonds wherein the ratio of the sum of the pendant tertiary amine groups and pendant aldehyde groups to reactive carbon-carbon double bonds in the poly(tertiary amine) is substantially equivalent to the ratio of pendant aldehyde groups to reactive carbon-carbon double bonds in the polyaldehyde, (b) contacting the poly(tertiary amine) of (a) and a primary amine or a second secondary amine under reductive amination conditions in the presence of (1) hydrogen and a ruthenium-containing imine hydrogenation catalyst or (2) an alkali metal borohydride to produce the polyamine having a substantially equivalent ratio of secondary amine groups or tertiary amine groups derived from the second secondary amine to reactive carbon-carbon double bonds as the ratio of aldehyde groups to reactive carbon-carbon double bonds in the poly(tertiary amine) of (a), provided that when the reductive amination of (b) is done with a primary amine in the presence of an alkali metal borohydride, the primary amine is a sterically hindered aliphatic or cycloaliphatic primary amine or an aromatic primary amine.

According to the process of the second embodiment of the invention, the polyaldehyde is produced by contacting a polymer containing olefinic unsaturation with carbon monoxide and hydrogen in the presence of a hydroformylation catalyst. In addition, when the reductive amination of (a) or (b) is conducted in the presence of hydrogen and a ruthenium-containing imine hydrogenation catalyst, the reductive amination can optionally be conducted in the presence of carbon monoxide. When carbon monoxide is present during the reductive amination, the molar ratio of carbon monoxide to hydrogen is less than about 0.15:1, preferably less than about 0.1:1, and most preferably less than about 0.05:1.

A third embodiment of the invention relates to a process for preparing a polyamine containing a controlled amount of pendant tertiary amine groups and a controlled amount of pendant secondary amine groups comprising: (a) contacting a polyaldehyde containing a controlled amount of pendant aldehyde groups and carbon-carbon double bonds, a first secondary amine and a primary amine under reductive amination conditions in the presence of (1) hydrogen and a ruthenium-containing imine hydrogenation catalyst or (2) an alkali metal borohydride to produce a poly(secondary/tertiary amine) having a substantially equivalent ratio of the sum of the number of tertiary amine groups and secondary amine groups to reactive carbon-carbon double bonds as the ratio of aldehyde groups to reactive carbon-carbon double bonds in the polyaldehyde, wherein the molar ratio of the first secondary amine to the primary amine is based on the relative reactivities of the first secondary amine and the primary amine and the desired controlled amounts of pendant tertiary amine and pendant secondary amine groups, provided that when the reductive amination is conducted in the presence of an alkali metal borohydride the primary amine is a sterically hindered aliphatic or cycloaliphatic primary amine or an aromatic primary amine.

According to the process of the third embodiment of the invention, the polyaldehyde is produced by contacting a polymer containing olefinic unsaturation with carbon monoxide and hydrogen in the presence of a hydroformylation catalyst. In addition, when the reductive amination is conducted in the presence of hydrogen and a ruthenium-containing imine hydrogenation catalyst the reductive amination can optionally be conducted in the presence of carbon monoxide. When carbon monoxide is present during the reductive amination, the molar ratio of carbon monoxide to hydrogen is less than about 0.15:1, preferably less than about 0.1:1, and most preferably less than about 0.05:1.

The polyamines made according to this invention are readily recoverable and well suited for use in rubber chemicals, urethane/urea materials, coatings, adhesives, sealants and when the polyamine contains pendant secondary amine groups, construction of three-dimensional networks through bonds not available to tertiary amines.

A fourth embodiment of the invention relates to polyamines comprising repeating units of

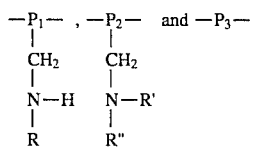

wherein $P_1$-containing and $P_2$-containing repeating units represents repeating units of a polymer containing olefinic unsaturation which has been hydroformylated and reductively aminated, $P_3$ represents the repeating unit of the same polymer containing olefinic unsaturation having reactive carbon-carbon double bonds, R, R' and R" are independently selected from the group consisting of aliphatic, aromatic, cycloaliphatic and substituted aliphatic, aromatic and cycloaliphatic groups, the sum of $P_1$-containing and $P_2$-containing repeating units is about 2 to about 90 percent of the sum of $P_1$-containing, $P_2$-containing and $P_3$ repeating units, and the number of $P_2$-containing repeating units is about 5 to about 95 percent of the sum of the number of $P_1$-containing and $P_2$-containing repeating units, provided the number of $P_1$-containing repeating units and $P_2$-containing repeating units are each at least 1 percent of the sum of the numbers of $P_1$-containing, $P_2$-containing and $P_3$ repeating units.

The substituent of the substituted aliphatic, aromatic and cycloaliphatic groups is selected from the group consisting of

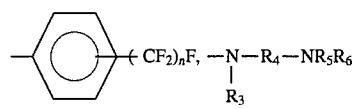

and mixtures thereof wherein $R_1$, $R_2$, $R_3$, $R_5$ and $R_6$ are independently selected from the group consisting of hydrogen, aliphatic groups, aromatic groups and cycloaliphatic groups, provided that at least one of $R_1$ and $R_2$ and at least one of $R_5$ and $R_6$ is other than hydrogen, $R_4$ is selected from the group consisting of aliphatic, aromatic and cycloaliphatic groups, m is an integer from 0 to 4 and n is an integer from 1 to 7.

The polyamines prepared according to the present invention contain essentially no repeating units of the formula:

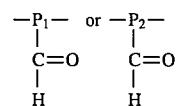

i.e., essentially all of the aldehyde groups in the polyaldehyde or poly(tertiary amine) containing pendant aldehyde groups are converted to amine groups during the reductive amination. In addition, when the polyamines prepared according to the present invention contain pendant secondary amine groups of the formula

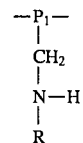

the polyamine contains essentially no repeating units of the formula:

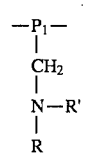

wherein R' is selected from the group consisting of aliphatic, aromatic, cycloaliphatic, substituted aliphatic, aromatic and cycloaliphatic groups and combinations thereof, i.e., the polyamines contain essentially no tertiary amine groups derived from the pendant secondary amine groups.

A fifth embodiment of the invention relates to polyamines comprising repeating units of

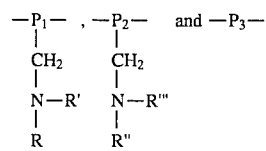

wherein $P_1$-containing and $P_2$-containing repeating units represent repeating units of a polymer containing olefinic unsaturation which has been hydroformylated and reductively aminated, $P_3$ represents the repeating unit of the same polymer containing olefinic unsaturation having reactive carbon-carbon double bonds, R, R', R" and R'" are independently selected from the group consisting of aliphatic, aromatic, cycloaliphatic and substituted aliphatic, aromatic and cycloaliphatic groups, provided that —NRR' is different than —NR"R''', the sum of $P_1$-containing and $P_2$-containing repeating units is 2 to about 90 percent of the sum of $P_1$-containing, $P_2$-containing and $P_3$ repeating units, and the number of $P_1$-containing repeating units is about 5 to about 95 percent of the sum of the number of $P_1$-containing and $P_2$-containing repeating units, provided the number of $P_1$-containing repeating units and $P_2$-containing repeating units are each at least 1 percent of the sum of the number of $P_1$-containing, $P_2$-containing and $P_3$ repeating units.

The substituent of the substituted aliphatic, aromatic and cycloaliphatic groups is as defined above.

Hydroformylation

In accordance with the present invention, the polyamines are prepared from aldehyde-functionalized polymers obtained by hydroformylating a polymer containing olefinic unsaturation or a poly(tertiary amine) containing reactive carbon-carbon double bonds prepared according to the invention.

The polymers containing olefinic unsaturation useful in the process of the present invention can be homopolymers formed from $C_4$ to $C_{10}$ monomers having multiple carbon-carbon double bonds therein, such as, for example, butadiene, isoprene, cyclopentadiene, dimers of cyclopentadiene, 1,3-pentadiene, 1,4-pentadiene, 1,3-hexadiene, 1,4-hexadiene, 1,5-hexadiene, 2,4-hexadiene, 1,3,5-hexatriene and the like. The polymer containing olefinic unsaturation used in the present invention may be in any of their isomeric stereo—configurations. In the case of polybutadiene, for example, it can be in its cis-1,4-, trans-1,4-, or trans-1,2- configuration or a mixture thereof. Further, the polymers useful in the process of the invention may be copolymers formed from two or more monomer compounds which are each capable of forming a polymeric segment containing carbon-carbon double bonds therein, such as copolymers having polybutadiene segments as, for example, copolymers of poly(butadiene-isoprene), poly(butadiene-1,4-pentadiene) and the like.

The polymers containing olefinic unsaturation useful in the process of the present invention can also be co-polymers formed from at least one monomer as described above capable of producing olefin containing polymer segments and at least one co-polymerizable vinyl monomer which does not form olefin containing polymer segments, such as acrylamides, acrylonitrile, styrene, acrylates, alkylvinyl ethers, alkylvinyl ketone and the like, and mixtures thereof, and $C_1$–$C_{20}$ hydrocarbyl derivatives of such monomers, such as α-methyl styrene, methyl acrylate and the like. Such materials are formed in conventional manners by free radical, cationic or anionic polymerization techniques, as are well-known. A large variety of these polymers can be readily obtained commercially, such as poly(butadiene-acrylonitrile), poly(butadiene-styrene), acrylonitrile-butadiene-styrene (ABS) resins, ethylene-propylene-diene (EPDM) polymers or the like. The polymers containing olefinic unsaturation can be formed with nonolefinic containing monomer groups in any degree desired as long as the resultant polymer contains sufficient amounts of carbon-carbon double bonds therein to act as an active precursor of the desired polyaldehyde product.

The polymers containing olefinic unsaturation useful in the process of the invention can also be formed from olefinic monomers such as ethylene, propylene, 1-butene, 1-pentene, 1-hexene, 2-methyl-1-propene, 3-methyl-1-pentene, 4-methyl-l-pentene, 3,3-dimethyl-1-butene, 2,4,4-trimethyl-1-pentene, 3-methyl-1-hexene, 3-methyl-1-butene and the like which produce, through branching, isomerization and the like polymeric materials having residual carbon-carbon double bonds therein.

Suitable polymers containing olefinic unsaturation include homopolymers such as polyethylene, polypropylene, polybutene, polybutadiene and polyoctene; co-polymers of olefins such as poly(ethylenepropylene), poly(ethyleneoctene), poly(ethyleneisobutylene), poly(ethylene-1-butene), poly(ethylenehexene) and poly(propyleneoctene); copolymers of olefins and at least one copolymerizable mono-olefinic monomers, e.g., copolymers of two or more olefins and a diene monomer, such as poly(ethylenepropylenediene monomer) (EPDM), poly(ethylenevinylacetate), poly(ethylenevinylalcohol), poly(ethyleneethyl acrylate), poly(propylenemethyl acrylate), copolymer of dienes and acrylonitrile such as a copolymer of butadiene and acrylonitrile; and the like.

Satisfactory diene monomers include straight chain (acyclic) dienes such as 1,4-hexadiene, 2-methyl-2,4-pentadiene, 1,4,9-decatriene and 11-ethyl-1,11-tridecadiene; monocyclic dienes such as 1,5-cyclooctadiene, dienes such as 5-ethylidene norbornene (ENB), 5-methylene-2-norbornene, 5-isopropylidene-2-norbornene and 2-methyl-bicyclo-(2.2.1)-2,5-heptadiene; fused ring bicyclics such as bicyclo(4.3.0)-3,7nonadienes, 5-methyl-bicyclo(4.3.0)-3,7-nonadiene, 5,6-dimethyl-bicyclo-(4.3.0)-3,7-nonadiene and bicyclo(3.2.0)-2,6-heptadiene; alkenyl substituted monocyclics such as 4-vinyl-cyclohexene, 1,2-divinyl cyclobutane and 1,2,4-trivinylcyclohexane; and tricyclics such as dicyclopentadiene (DCPD). Grades of EPDM rubbers suitable for use in the practice of the invention are commercially available; Rubber World Blue Book 1975 Ed., *Materials and Compounding Ingredients for Rubber*, pp 406–410. Preferred EPDM rubbers are those marketed by Uniroyal Chemical Company, Inc., Middlebury, Conn. under the tradename Trilene®, such as Trilene® 66 and 67 (ENB diene monomer), Trilene® 55 and 65 (DCPD diene monomer) and the like. Other preferred EDPM rubbers include those wherein the diene monomer is 5-isopropylidene-2-norbornene. Although not specifically required, the ethylene and propylene ratio in such EPDM rubbers is preferably within a range of from about 40/60 to about 50/50.

The preferred polymers containing olefinic unsaturation useful in the present invention are polybutadienes and poly(ethylenepropylenediene monomer).

In order to undergo the hydroformylation reaction, the polymer containing olefin unsaturation or the poly(tertiary amine) containing reactive carbon-carbon double bonds must contain a level of unsaturation, i.e., as carbon-carbon double bond, which is the site where the syngas (carbon monoxide and hydrogen) will form the aldehyde (—CHO) group. This unsaturation can be present in the backbone of the polymer and/or in a pendant group thereof, e.g., as in EPDM polymers. Preferably the level of unsaturation in the polymer containing olefinic unsaturation will be in the range of from 1 carbon-carbon double bond per polymer chain (or molecule) up to about 1 carbon-carbon double bond per 4 carbon atoms. Procedures for determining the level of unsaturation of polymers are well known. For example, the level of unsaturation can be determined utilizing ASTM D-1638-59T. The level of unsaturation can also be determined utilizing infrared spectroscopy or $^1$H NMR. This method can be conducted according to well known procedures as described in Willard et al, *Instrumental Methods of Analysis*, Chapters 5 and 6, Van Nostrand Co., Inc., Publishers (1965). Alternatively, well known titration methods can also be utilized. A preferred method for determining unsaturation levels is $^1$H NMR.

Suitable polymers containing olefinic unsaturation are those having a weight average molecular weight ($M_w$) of from about 300 to about 250,000, preferably about 600 to about 150,000, and most preferably about 1000 to about 15,000.

The polymer containing olefinic unsaturation or the poly(tertiary amine) containing reactive carbon-carbon double bonds is mixed with carbon monoxide and hydrogen, with the polymer in the melt phase or dissolved in an inert solvent. Where no solvent is utilized, the polymer is heated to above the glass transition temperature ($T_g$) corresponding to the specific polymer and then the carbon monoxide and hydrogen are added thereto and mixed. Where an inert solvent is utilized, the polymer is dissolved in the solvent and then the carbon monoxide and hydrogen are added and mixed. Suitable inert solvents for dissolving the polymer include toluene and toluene/dimethylformamide mixtures.

The hydrogen and carbon monoxide are contacted with the polymer in a hydrogen to carbon monoxide molar ratio of about 1:3 to about 3:1, preferably about 1:2 to about 2:1, and most preferably about 1:1. Throughout the course of the reaction, the presence of hydrogen and carbon monoxide is preferably essentially maintained at the initial molar ratio.

Following addition of carbon monoxide and hydrogen, a suitable catalyst is added to the mixture. Alternatively, the catalyst can be contacted with polymer prior to addition of the hydrogen and carbon monoxide. Suitable catalysts for hydroformylating the polymer containing olefinic unsaturation include, but are not limited to Group VIII metal catalysts. The preferred Group VIII metal is rhodium (I). Examples of suitable rhodium (I) catalysts include dicarbonyl acetylacetonate rhodium (I) ($Rh(CO)_2AcAc$), cyclooctadiene trifluoroacetyl rhodium (I) dimer ($[Rh(COD)(O_2CCF_3)]_2$), $RhH(CO)(PPh_3)_3$, and the like. Preferred hydroformylation catalysts are $Rh(CO)_2AcAc$ and $RhH(CO)(PPh_3)_3$.

The hydroformylation reaction is conducted under a carbon monoxide/hydrogen atmosphere. The pressure of carbon monoxide/hydrogen during the hydroformylation reaction is about 50 psig to about 1000 psig, preferably about 200 psig to about 1000 psig. The temperature of the hydroformylation reaction is about 25° C. to about 200° C., preferably about 50° C. to about 150° C., and most preferably about 80° C. to about 120° C. The functional density of the polyaldehyde or poly(tertiary amine) containing pendant aldehyde groups produced during the hydroformylation reaction will vary depending on the amounts of carbon monoxide and hydrogen relative to the degree of unsaturation existing in the starting polymer containing olefinic unsaturation or the poly(tertiary amine) containing reactive carbon-carbon double bonds. The functional density of the polyaldehydes is controlled by measuring the carbon monoxide/hydrogen gas uptake during the hydroformylation reaction. In this way the amount of aldehyde groups placed on the polymer containing olefinic unsaturation or the poly(tertiary amine) containing reactive carbon-carbon double bonds can be measured and controlled. When the desired functional density is achieved, the reaction can be stopped.

The hydroformylation catalysts, particularly the rhodium (I) catalysts, are utilized in the hydroformylation reaction at levels of less than about 200 parts of catalyst based on metal rhodium per $10^6$ parts of polymer containing olefinic unsaturation. Thus, the hydroformylation reaction can be conducted economically, i.e., at low catalyst cost, and at relatively mild conditions.

The process of the present invention provides the ability to control functional density of the polyaldehyde from 2 mole percent to about 90 mole percent wherein functional density is the mole percent of carbon-carbon double bonds in the polymer containing olefinic unsaturation which are hydroformylated to aldehyde groups. Although the process of the invention allows the functional density of the polyaldehyde to be controlled anywhere within the above range, it is preferable to have a functional density within the range of about 10 mole percent to about 85 mole percent. Similarly, when a poly(tertiary amine) containing reactive carbon-carbon double bond is hydroformylated, the process of the present invention provides the ability to control functional density of the aldehyde groups produced by hydroformylating the available reactive carbon-carbon double bonds in the poly(tertiary amine) such that the overall functional density of the poly(tertiary amine) is from 2 mole percent to about 90 mole percent. The overall functional density is the mole percent of carbon-carbon double bonds in the polymer containing olefinic unsaturation which are hydroformylated to aldehyde groups either before or after the reductive amination to tertiary amine groups.

In one embodiment, the polyaldehyde can be recovered prior to reductive amination. If the polyaldehyde is recovered, the recovery can be by any conventional recovery method. For example, when the hydroformylation reaction is conducted in the presence of a solvent, e.g., toluene, the amount of solvent in the reaction mixture can be reduced and the polyaldehyde precipitated by slow addition of methanol while stirring the mixture. The polymer can then be recovered, redissolved in the original solvent and precipitated again with methanol. The purified polyaldehyde can then be recovered.

Reductive Amination

Reductive amination is conducted by reacting the above-described polyaldehyde with a first secondary amine and hydrogen in a suitable solvent in the presence of a ruthenium-containing imine hydrogenation catalyst or by reacting the above-described polyaldehyde with a first secondary amine in the presence of an alkali metal borohydride. The poly(tertiary amines) prepared according to the process of the invention have a substantially equivalent ratio of tertiary amine groups to reactive carbon-carbon double bonds as the ratio of aldehyde groups to reactive carbon-carbon double bonds in the polyaldehyde.

Reductive amination of a poly(tertiary amine) containing a controlled amount of aldehyde groups and reactive carbon-carbon double bonds is conducted by reacting the poly(tertiary amine) with a primary amine or a second secondary amine and hydrogen in a suitable solvent in the presence with a ruthenium-containing imine hydrogenation catalyst or by reacting the above-described poly(tertiary amine) with a primary amine or a second secondary amine in the presence of an alkali metal borohydride, provided that when the reductive amination is done with a primary amine in the presence of an alkali metal borohydride, the primary amine is a sterically hindered aliphatic or cycloaliphatic primary amine or an aromatic primary amine. The polyamines prepared according to the process of the invention have a substantially equivalent ratio of secondary amine groups or tertiary amine groups derived from the second secondary amine to reactive carbon-carbon double bonds as the ratio of aldehyde groups to reactive carbon-carbon double bonds in the poly(tertiary amine) containing a controlled amount of aldehyde groups and reactive carbon-carbon double bonds.

The polyamine and/or poly(tertiary amine) functional density will depend on the functional density of aldehyde groups in the polyaldehyde and/or poly(tertiary amine). Thus, the functional density of the polyamine can be readily controlled within the range of 2 mole percent to about 90 mole percent wherein the total pendant amine functional density is based on the level of carbon-carbon double bonds in the polymer containing olefinic unsaturation utilized to prepare the starting polyaldehyde. Thus, the total pendant amine functional density in the polyamine can range anywhere within the range of 2 mole percent to about 90 mole percent, preferably from about 10 mole percent to about 85 mole percent, depending on the particular functional density desired for the end-use application of the polyamine. The functional density of pendant tertiary-amine groups derived from the first secondary amine in the polyamine is about 5 to about 95 percent of the total pendant amine functionality, provided the functional density of pendant tertiary amine groups derived from the first secondary amine is at least 1 mole percent and the functional density of pendant secondary amine groups or tertiary amine groups derived from the second secondary amine is at least 1 mole percent. As such, the remainder of the total pendant amine functionality is derived from the functional density of pendant secondary amine groups or pendant tertiary amine groups derived from the second secondary amine in the polyamine.

Suitable amines for use in the process of the invention utilizing the ruthenium-containing imine hydrogenation catalyst are secondary amines represented by the formula RR'NH wherein R and R' are independently selected from the group consisting of aliphatic, aromatic, cycloaliphatic, and substituted aliphatic, aromatic and cycloaliphatic groups, and primary amines represented by the formula $RNH_2$ wherein R is as defined above. In the embodiments of the invention where a first secondary amine and a second secondary amine are utilized, R and R' are selected such that the first secondary amine is different from the second secondary amine. In the case of substituted aliphatic, aromatic and cycloaliphatic groups, the substituent on the aliphatic, cycloaliphatic or aromatic group is selected from the group consisting of

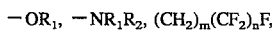

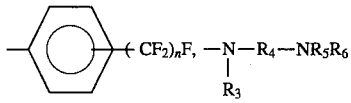

and mixtures thereof wherein $R_1$, $R_2$, $R_3$, $R_5$ and $R_6$ are independently selected from the group consisting of hydrogen, aliphatic groups, aromatic groups and cycloaliphatic groups, provided that at least one of $R_1$ and $R_2$ and at least one of $R_5$ and $R_6$ is other than hydrogen, $R_4$ is selected from the group consisting of aliphatic, aromatic and cycloaliphatic groups, m is an integer from 0 to 4 and n is an integer from 1 to 7. When a substituted primary or secondary amine is used in the process of the invention, the preferred substituent is selected from the group consisting of $-OR_1$ and $-NR_1R_2$, and the most preferred substituent is $-NR_1R_2$ wherein one of $R_1$ and $R_2$ is hydrogen and the other of $R_1$ and $R_2$ is an aliphatic or cycloaliphatic group.

As used herein, the term "aromatic" refers to an unsaturated cyclic hydrocarbon containing one or more rings and preferably from 6 to about 14 carbon atoms. Examples of aromatic rings include, but are not limited to, phenyl, naphthyl, and the like. As used here, the term "aliphatic" refers to a straight- or branched-chain hydrocarbons having 1 to about 22 carbon atoms. As used herein, the term "cycloaliphatic" refers to alicyclic compounds, i.e., hydrocarbon compounds characterized by arrangement of the carbon atoms in closed ring structures, having from 3 to about 18 carbon atoms, preferably 3 to about 8 carbon atoms. Examples of cycloaliphatic rings include, but are not limited to, cyclopropyl, cyclopentyl, cyclohexyl, cyclooctyl, and the like.

Examples of suitable primary amines include, but are not limited to, methyl amine, ethyl amine, isopropyl amine, n-butyl amine, n-hexyl amine, n-octyl amine, 2-aminoheptane, cyclohexyl amine, cyclooctyl amine, aniline, benzyl amine, 2-aminoethanol, 4-amino-1-butanol, 2-amino-1-butanol, 6-amino-1-hexanol, 2-amino-1-methoxy propane, 4-amino phenol, 4-amino cyclohexanol, 4-aminobenzotrifluoride, N-isopropyl-4-aminophenyl amine, N-(2-butyl)-4-aminophenyl amine, N-methylisoamyl-4-aminophenyl amine, N-cyclohexyl-4-aminophenyl amine, N-octyl-4-aminophenyl amine, 4-aminodiphenyl amine, N,N-dimethyl ethylene diamine, and the like.

Examples of suitable secondary amines include, but are not limited to, dimethylamine, diethylamine, methylethylamine, n-methylethanolamine, di(n-propyl)amine, di(ethylhexyl)amine, piperidine, morpholine, piperazine, di(n-heptyl)amine, N-methylaniline, 2-aminooctane, 4-aminodiphenylamine, N-phenyl-N'-cyclohexyl-p-phenylenediamine, N,N'-bis(1-methylpropyl)-p-phenylenediamine, dibenzylamine, methylnaphthylamine, and the like. Suitable amines for use in the process of the invention utilizing an alkali metal borohydride are the secondary amines as defined above, sterically hindered aliphatic or cycloaliphatic primary amines, aromatic primary amines, and substituted sterically hindered aliphatic or cycloaliphatic and aromatic primary amines. In the case of substituted sterically hindered aliphatic or cycloaliphatic and aromatic primary amines, the substituent on the aliphatic, cycloaliphatic or aromatic groups are as defined above.

Examples of suitable sterically hindered aliphatic or cycloaliphatic amines include, but are not limited to, isopropyl amine, cyclohexyl amine, cyclooctyl amine, isobutyl amine and cyclopentylamine.

In the first embodiment of the invention, the amount of first secondary amine used in the process of the invention can be conveniently expressed in terms of a ratio of moles of first secondary amine to moles of —CHO in the polyaldehyde, i.e., the amount of first secondary amine will vary depending on the functional density of the polyaldehyde. Such molar ratio can vary from about 1:1 to about 30:1, preferably about 1:1 to about 20:1, and most preferably about 2:1 to about 10:1. The resulting poly(tertiary amines) contain pendant tertiary amine functional groups wherein essentially all of the aldehyde groups are aminated. The amount of primary amine or second secondary amine used in the process of the invention can be conveniently expressed in terms of a ratio of moles of primary amine to moles of —CHO in the poly(tertiary amine), i.e., the amount of primary amine or secondary secondary amine will vary depending on the functional density of aldehyde groups in the poly(tertiary amine). Such molar ratio can vary from about 1:1 to about 30:1, preferably about 1:1 to about 20:1, and most preferably about 2:1 to about 10:1. The resulting polyamines contain pendant secondary and tertiary functional groups wherein essentially all of the aldehyde groups are reductively aminated.

In the second embodiment of the invention, the amount of first secondary amine used in the process of the invention can be conveniently expressed in terms of a ratio of moles of first secondary amine to moles of —CHO in the polyaldehyde, i.e., the amount of first secondary amine will vary depending on the functional density of the polyaldehyde and the desired percentage of the pendant aldehyde groups to be reductively aminated. Such molar ratio will typically be about 1:1 based on the amount of aldehyde groups to be reductively aminated with the first secondary amine. Alternatively, the molar ratio can vary from 0.01:1 to 0.99:1 based on the total amount of aldehyde groups in the polyaldehyde. The amount of primary amine or second secondary amine used in the process of the invention can be conveniently expressed in terms of a ratio of moles of primary amine or second secondary amine to moles of —CHO in the poly(tertiary amine), i.e., the amount of primary amine or second secondary amine will vary depending on the functional density of the aldehyde groups in the poly(tertiary amine). Such molar ratio can vary from about 1:1 to about 30:1, preferably about 1:1 to about 20:1, and most preferably about 2:1 to about 10:1. The resulting polyamines contain pendant amine functional groups wherein essentially all of the aldehyde groups are reductively aminated.

In the third embodiment of the invention, the amount of total amine used in the process of the invention can be conveniently expressed in terms of a ratio of moles of total amine to moles of —CHO in the polyaldehyde, i.e., the amount of total amine will vary depending on the functional density of the polyaldehyde. Such molar ratio can vary from about 1:1 to about 30:1, preferably about 1:1 to about 20:1, and most preferably about 2:1 to about 10:1. The amounts of secondary amine and primary amine used in the process of the invention can be conveniently expressed in terms of a molar ratio of primary amine to secondary amine. Such molar ratio will vary depending on (1) the desired amount of pendant secondary and tertiary amine groups on the polyamine product and (2) the relative reactivities of the primary and secondary amines. One of ordinary skill in the art will be able to readily able to determine the desired molar ratio of primary amine to secondary amine with a limited number of routine experiments based on the guidance provided in the instant specification. The resulting polyamines contain pendant tertiary and secondary amine functional groups wherein essentially all of the aldehyde groups are reductively aminated.

The catalyst used in the reductive amination reaction will be a ruthenium-containing imine hydrogenation catalyst which does not hydrogenate the carbon-carbon double bonds during the reductive amination. The ruthenium-containing imine hydrogenation catalyst may take many different forms. For instance, the ruthenium may be added to the reaction mixture in an oxide form, as in the case of for example, ruthenium(IV) oxide hydrate, anhydrous ruthenium(IV) dioxide and ruthenium(VIII) tetroxide. Alternatively, it may be added as the salt of a mineral acid, as in the case of ruthenium(III) chloride hydrate, ruthenium(III) bromide, ruthenium(III) iodide, tricarbonyl ruthenium(II) iodide, anhydrous ruthenium(III) chloride and ruthenium nitrate, or as the salt of a suitable organic carboxylic acid, for example, ruthenium(III) acetate, ruthenium naphthenate, ruthenium valerate and ruthenium complexes with carbonyl-containing ligands, such as ruthenium(III) acetylacetonate. The ruthenium may also be added to the reaction zone as a carbonyl or ruthenium carbonyl hydride derivative. Here, suitable examples include triruthenium dodecacarbonyl and other ruthenium carbonyl hydrides such as $H_2Ru_4(CO)_{13}$ and $H_4Ru_4(CO)_{12}$, and substituted carbonyl species such as the tricarbonylruthenium(II) chloride dimer, $[Ru(CO)_3Cl_2]_2$.

Preferred ruthenium-containing imine hydrogenation catalysts include oxides of ruthenium, ruthenium salts of an organic carboxylic acid and ruthenium carbonyl or ruthenium carbonyl hydride derivatives. Among these, particularly preferred are ruthenium(IV) dioxide hydrate, ruthenium tetroxide, anhydrous ruthenium(IV) oxide, ruthenium acetate, ruthenium(III) acetylacetonate, and triruthenium dodecacarbonyl. The most preferred ruthenium-containing imine hydrogenation catalyst is triruthenium dodecacarbonyl ($Ru_3(CO)_{12}$).

The reductive amination is conducted under a hydrogen atmosphere when a ruthenium-containing imine hydrogenation catalyst is utilized. The reductive amination may optionally be conducted under a hydrogen and carbon monoxide atmosphere wherein the ratio of carbon monoxide to hydrogen is less than about 0.15:1, preferably less than about 0.1:1, and most preferably less than about 0.05:1. The pressure of hydrogen or hydrogen/carbon monoxide during the reductive amination is about 150 psig to about 1000 psig, preferably about 200 psig to about 1000 psig. The temperature of the reductive amination is from about 110° C. to about 200° C., preferably about 120° C. to about 150° C.

The alkali metal borohydrides used in the reductive amination are preferably sodium or lithium borohydrides, most preferably sodium borohydrides. Examples of suitable alkali metal borohydrides include, but are not limited to, $NaBH(O_2CCH_3)_3$, $NaBH_3CN$, $NaBH_4$, $LiBH_4$ and mixtures thereof. Currently preferred alkali metal borohydrides are $NaBH(O_2CCH_3)_3$ and $NaBH_3CN$ because of their effectiveness and good results obtained therewith.

The reductive amination is typically conducted in the presence of a suitable solvent system. Examples of suitable solvent systems include, but are not limited to, toluene, xylene, mixtures of dimethylformamide (DMF) with an alkane or a cycloalkane, such as DMF/cyclohexane, ethers such as tetrahydrofuran, chlorinated hydrocarbons such as dichloroethane, and the like, and mixtures thereof. The currently preferred solvent system when a ruthenium-containing imine hydrogenation catalyst is used is a mixture of DMF and cyclohexane. The currently preferred solvent system when an alkali metal borohydride is used is tetrahydrofuran.

The polyamines prepared by the process of the invention can be recovered by any conventional recovery method. Examples such recovery methods can be found in the examples herein.

EXAMPLES

Example 1

This example demonstrates the preparation of a polybutadiene-based polyaldehyde.

A 1000.19 g sample of polybutadiene (Revertex N4500; 45% vinyl MN=4500) was dissolved in 1300 mL of toluene. Under a $N_2$ atmosphere, this polymer solution was poured into a 1 gal. autoclave. Next 6.9 g of triphenylphosphine and 0.42 g of hydridocarbonyltris-(triphenylphosphine)-rhodium (I) were added to the clave under $N_2$. The clave was sealed and further degassed with $N_2$ by pressuring the clave with 200 psi of $N_2$ and then venting the $N_2$ gas. The clave was then heated to 80° C. under 400 psi of $N_2$. After removing the $N_2$, the clave was charged with 160 psi 1:1 $CO/H_2$ at 80° C. The reaction was stirred at 1000 rpm until 2487 psig of 1:1 $CO/H_2$ were reacted from a calibrated reservoir. After venting the clave, the polymer product was removed. The clave was washed with 100 mL of toluene and the washings were added to the polymer product. The product solution was concentrated by rotary evaporation. This polymer solution was then slowly dripped into a solution containing 4:1 methanol/water. The solution was allowed to separate into two phases and the top phase was decanted. The bottom polymer phase was dissolved in toluene and the above precipitation procedure was repeated. From this procedure, the polymer product was isolated. An infrared spectrum of a thin film of the polymer product on a KBr plate indicated aldehyde absorption at 1730 cm$^{-1}$. $^1$H NMR indicated that 32.67% of the double bonds in the P(bd) polymer were hydroformylated. The aldehyde protons are integrated relative to the olefinic peaks in the polymer backbone in order to calculate the percentage of butadiene units that have been hydroformylated. Selected $^1$H NMR resonances: δ9.75 major (>90%); 9.55 and 9.65 minor, aldehyde; 4.8–5.1, m, CH$_2$=C, 5.15–5.65, m.

Example 2

This example demonstrates the preparation of poly(tertiary amine) using the polyaldehyde prepared in Example 1.

A toluene solution of polyaldehyde (1) prepared in Example 1 was concentrated in vacuo. A 1 gal. autoclave was then charged with 306 g of 1 in 909 ml DMF, 573 mL of cyclohexane, 318 g of dimethylamine and 3.1 g of ruthenium carbonyl. The autoclave was sealed and purged with 100 psig of CO/H$_2$. The autoclave was charged with 100 psig of CO/H$_2$ and 900 psig of H$_2$ and was heated to 120° C. with a stirring speed of 1000 rpm. Gas uptake began when the reaction temperature reached approximately 100° C. The reaction was allowed to proceed until gas uptake ceased (approximately 4 h). After cooling to room temperature, the contents of the autoclave were removed and placed in three 2 L separatory funnels and allowed to phase separate. The total volume level was marked on each of the funnels. The lower reddish-brown DMF level was removed and discarded. 300 mL of DMF were added to each separatory funnel and cyclohexane was also added to increase the liquid level in the flasks to the original volume. The funnels were shaken to extract the cyclohexane layer with the DMF and the separation procedure was repeated. The DMF extraction procedure was performed a total of three times. The cyclohexane layer was filtered with a medium porosity glass-fritted buchner funnel and rotovapped at 50° C. with toluene to remove residual DMF. The polymer was dried on a vacuum line for 2 h. $^1$H NMR in d$_4$-acetic acid indicated total conversion of aldehyde to tertiary amine groups. The aminated polymer was then stored in toluene in the dark. Selected proton NMR resonances (CD$_3$CO$_2$D): Olefinic peaks: δ5.45–5.1, m, and 4.9–4.65, m, CH$_2$=C; δ2.65, s, (CH$_3$)$_2$NH+; δ2.9, s, polymer-CH$_2$NH (CH$_3$)$_2$. No aldehyde peaks were observed.

Example 3

This example demonstrates an alternate preparation of poly(tertiary amine) using a polyaldehyde prepared according to the method of Example 1.

A solution of polyaldehyde prepared according to the method of Example 1 having 33% of the carbon-carbon double bonds in the polybutadiene hydroformylated (63.14 g) in 100 mL of 4Å molecular sieve dried toluene and 20 mL of methanol was placed in a 2 L 3-neck round bottom flask that was equipped with a thermometer, addition funnel and a magnetic stir bar. The solution was further diluted with 500 mL of THF and 40 mL of methanol. After cooling to 5° C. under N$_2$, dimethylamine (50 g) was added with stirring. After 15 min, 85.8 mL of a 4.5M HCl in dioxane solution was slowly added to the solution by means of an addition funnel. Finally, 17 g of sodium cyanoborohydride was added by means of a funnel and rinsed into the flask with 20 mL of THF. The solution was stirred for 40 h and allowed to warm slowly to room temperature. The polymer solution was stirred with 60 mL of water for 1 h and then filtered. The filtrate was concentrated to a 200 mL volume and after settling for 2 h, the top polymer phase was slowly dripped into a mixture of 400 mL of methanol and 100 mL of water. The bottom polymer phase was decanted and isolated. The precipitation procedure was repeated. 64.6 g of poly(tertiary amine) was isolated.

Anal. Found: %C 80.62, %H 11.66, %N 6.62 $^1$H NMR in d$_4$-acetic acid indicated total conversion of aldehyde to tertiary amine groups. Selected proton NMR resonances (CD$_3$CO$_2$D): Olefinic peaks: δ5.45–5.1, m, and 4.9–4.65, m, CH$_2$=C: δ2.65, s, (CH$_3$)$_2$NH+; δ2.9, s, polymer —CH$_2$NH(CH$_3$)$_2$. No aldehyde peaks were observed.

Example 4

This example demonstrates the preparation of a polybutadiene based poly(tertiary amine) with a controlled amount of aldehyde groups.

A polybutadiene-based poly(tertiary amine) prepared in Example 2 (30 g) containing 32.67% of the carbon-carbon double bonds functionalized with dimethyl amino groups was dissolved in 180 mL of toluene in a 300 mL Parr reactor. HRh(CO)(PPh$_3$)$_3$(0.009 g) and PPh$_3$(0.09 g) were added to the reactor. The reactor was sealed and then purged three times with 25 psig of nitrogen. The reactor was heated to 100° C. under 3 psig of nitrogen. When the reactor temperature had stabilized at 100° C., the reactor was then charged with 600 psig of syngas (H$_2$/CO 1:1). Gas uptake was monitored using a calibrated reservoir and when the desired amount of gas had been taken up the reactor was cooled and vented to terminate the reaction. The reaction mixture was then removed from the reactor. A small sample was dried in vacuo and analyzed by $^1$H nmr. The nmr revealed that 43.07% of the double bonds in the starting poly(tertiary amine) or 29.00% of the original double bonds were now functionalized with aldehyde groups.

Example 5

This example demonstrates the preparation of polybutadiene-based polyamine utilizing the poly(tertiary amine) with a controlled amount of aldehyde groups prepared in Example 4.

The poly(tertiary amine) containing a controlled amount of aldehyde groups prepared in Example 3 was condensed on a rotary evaporator to remove almost all of the toluene present. The polymer was then dissolved in a mixture of 60 mL of dimethyl formamide (DMF) and 60 mL of cyclohexane. Ru$_3$(CO)$_{12}$(0.100 g) was added and isopropyl amine (3 equiv./CHO; 0.318 mole; 18.80 g) was added. The reactor was closed and purged 6 times with H$_2$/CO (1:1). The reactor was charged to 67 psig with H$_2$/CO (1:1) and then charged to a total pressure of 412 psig with H$_2$. The reactor was heated to 120° C. When the reactor had stabilized at temperature, the reactor was charged up to 600 psig with H$_2$ and allowed to react overnight. The reactor was cooled and vented. The reaction mixture was filtered through glass wool and then placed in a 250 mL separatory funnel and allowed to phase separate. The cyclohexane layer was washed 3 times with 60 mL of DMF and then the cyclohexane layer was isolated and all solvents were removed. The polymer was then redissolved in toluene. Samples were dried under vacuum for analysis. $^1$H nmr in $d_4$-acetic acid revealed peaks characteristic for dimethylamino and isopropylamino groups attached to the polymer. No unreacted aldehyde was visible in the nmr.

Elemental analysis: Calculated: C 78.02%; H 12.84%; N 9.14% Found: C 77.79%; H 12.98%; N 9.04%. This indicates that we have selectively functionalized the polymer with secondary and tertiary amine groups as desired. The final product was a stable, soluble polymer.

Example 6

This example is a comparative example demonstrating that a stable, soluble polyamine containing controlled amounts of secondary and tertiary amine groups is not produced when the secondary amine groups are added prior to the tertiary amine groups.

Polyaldehyde:

Polybutadiene (25.0 gms; Aldrich 20,050-6; 4500 M.N.; 45% vinyl; 55% cis and trans) was weighed into a 300 mL Parr reactor. Triphenylphosphine (PPh$_3$; 0.30 gm) was added to the reactor and HRh(CO)(PPh$_3$)$_3$ (0.03 gm) was also added to the reactor. The reactants were dissolved in 150 mL of toluene and the reactor was closed. The reactor was purged with stirring three times with 25 psig of nitrogen and then under 2 psig of nitrogen, the reactor was heated to 100° C. When the reactor had stabilized at temperature, the reactor was charged with 200 psig of H$_2$/CO (syngas). Gas uptake was monitored by observing pressure drop in a calibrated reservoir. When the appropriate amount of gas was taken up, the reaction was stopped by quickly cooling the reaction and venting the syngas. The reaction mixture was then purged with nitrogen (3×25 psig) and removed from the reactor. The solution was concentrated by rotary evaporation. The polymer was cleaned by precipitation from toluene with methanol/water (4:1). The solvents were decanted and the polymer was redissolved in toluene and precipitated again with methanol/water (4:1). The polymer was redissolved in toluene and a sample was dried for $^1$H NMR analysis. $^1$H NMR revealed 33.85% functionalization with aldehyde groups.

Polysecondary amine:

An aliquot of polyaldehyde solution (12.69 gm solution; 5.0 gms polymer) was weighed out and the toluene was removed by rotary evaporation. The polymer was dissolved in dimethyl formamide (DMF) and transferred to a 300 mL Parr reactor with a total of 75 mL of DMF. Ruthenium carbonyl (Ru$_3$(CO)$_{12}$; 0.01 gm) and isopropyl amine (3.0 equivalents; 6.74 gm) were added to the reactor. Cyclohexane (75 mL) was added to the reactor and the reactor was closed. The reactor was purged two times with 60 psig of syngas (H$_2$/CO; 1:1). The reactor was charged with 60 psig of syngas and then up to a total pressure of 400 psig with hydrogen. The inlet valves were closed and the reactor was heated up to 120° C. The reaction was allowed to proceed for 7 hrs at which point gas uptake had ceased. The reactor was cooled and vented and then purged three times with 25 psig of nitrogen. The reaction mixture was removed from the reactor and allowed to phase separate in a 500 mL separatory funnel. When phase separation was complete the lower DMF layer was removed. The cyclohexane layer was extracted a second time by adding DMF (75 mL) and cyclohexane (30 mL) to the polymer solution, mixing and then allowing the phases to separate. The DMF layer was removed and the cyclohexane layer was dried on a rotary evaporator. The polymer was redissolved in toluene. $^1$H NMR of an aliquot of the polymer showed the conversion of aldehyde groups to isopropylamine groups on the polymer.

Polysecondary Amine-Aldehyde:

The isopropylamino substituted polybutadiene in toluene was put into a 100 mL Parr reactor. Triphenylphosphine (1.5 gm) and HRh(CO)(PPh$_3$)$_3$ (0.03 gm) were added to the reactor and washed in with a small amount of toluene (~5 mL). The reactor was closed and purged three times with 25 psig of nitrogen. The reactor was then heated to 100° C. under 2 psig of nitrogen. When the reactor had equilibrated at temperature, it was charged with 200 psig of syngas. The reaction was allowed to proceed until 55 psig of gas had been taken up from a calibrated reservoir. The reactor was cooled and vented and then purged three times with 25 psig of nitrogen. The reaction mixture was removed from the reactor, placed in a bottle, sparged with nitrogen, and then kept in the freezer. An aliquot of the solution was dried on a vacuum line for $^1$H NMR analysis. Because there are active formyl groups and secondary amine groups on the polymer, the aliquot was dried for a very short period of time (30 sec) to remove the bulk of the toluene. An aliquot that was dried for a longer period of time gelled and would not dissolve in organic solvents. The polymer was then dissolved in CDCl$_3$. $^1$H NMR of the polymer showed that 17.42% of the original double bonds in the polymer were hydroformylated.

Reductive Amination of Polysecondary Amine-Aldehyde:

Polysecondary amine-aldehyde in toluene was placed in a 300 mL Parr Reactor. Ruthenium carbonyl (Ru$_3$(CO)$_{12}$, 0.100 gm) was added to the reactor. Dimethylamine was bubbled through a separate tared flask containing 50 mL of DMF, closed with a rubber stopper, until enough dimethylamine (1.68 gm, 3 equiv.) had dissolved in the DMF. The dimethyl amine solution was added to the reactor and the reactor was closed. The reactor was purged two times with 100 psig of syngas (1:1 H$_2$/CO) and then charged to 60 psig with syngas. The reactor was then charged to a total of 400 psig with hydrogen and then with the inlet valves closed the reactor was heated to 120° C. The reaction was allowed to proceed for 17 hrs at which point gas uptake had ceased. The reactor was cooled and vented and then purged three times with 25 psig of nitrogen. The reaction mixture was removed from the reactor. The toluene was removed from the solution by rotary evaporation and at this point the polymer gelled and was no longer soluble in organic solvents. This method did not make a stable, soluble polymer containing both secondary and tertiary amine groups.

That which is claimed is:

1. A process for preparing a polyamine containing a controlled amount of pendant tertiary amine groups and a controlled amount of pendant secondary amine or different tertiary amine groups comprising:

(a) contacting a polyaldehyde containing a controlled amount of pendant aldehyde groups and carbon-carbon double bonds and a first secondary amine under reductive amination conditions in the presence of (1) hydrogen and a ruthenium-containing imine hydrogenation catalyst or (2) an alkali metal borohydride to produce a poly(tertiary amine) having a substantially equivalent ratio of tertiary amine groups to carbon-carbon double bonds as the ratio of aldehyde groups to carbon-carbon double bonds in said polyaldehyde, (b) contacting said poly(tertiary amine) containing carbon-carbon double bonds with carbon monoxide and hydrogen under hydroformylation conditions in the presence of a hydroformylation catalyst to produce a poly(tertiary amine) containing a controlled amount of aldehyde groups and carbon-carbon double bonds, and (c) subsequently contacting said poly(tertiary amine) containing a controlled amount of aldehyde groups and carbon-carbon double bonds with a primary amine or a second secondary amine and reacting said poly(tertiary amine) containing a controlled amount of aldehyde groups and carbon-carbon double bonds and said primary amine or said second secondary amine under reductive amination conditions in the presence of (1) hydrogen and a ruthenium-containing imine hydrogenation catalyst or (2) an alkali metal borohydride to produce said polyamine having a substantially equivalent ratio of secondary, amine groups derived from said primary amine or tertiary amine groups derived from said second secondary amine to carbon-carbon double bonds as the ratio of aldehyde groups to carbon-carbon double bonds in said poly(tertiary amine) containing a controlled amount of aldehyde groups and carbon-carbon double bonds, provided that when said reductive amination of (c) is done with a primary amine in the presence of an alkali metal borohydride, said primary amine is a sterically hindered aliphatic or cycloaliphatic primary amine or an aromatic primary amine.

2. The process of claim 1 wherein said first secondary amine and said second secondary amine are represented by the formula RR'NH and said primary amine is represented by the formula $RNH_2$ wherein R and R' are independently selected from the group consisting of aliphatic, aromatic, cycloaliphatic, and substituted aliphatic, aromatic and cycloaliphatic groups provided said first secondary amine and said second secondary amine are different.

3. The process of claim 2 wherein the substituent on said substituted aliphatic, aromatic or cycloaliphatic groups is selected from the group consisting of

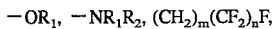

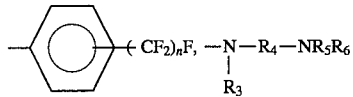

and mixtures thereof wherein $R_1$, $R_2$, $R_3$, $R_5$ and $R_6$ are independently selected from the group consisting of hydrogen, aliphatic groups, aromatic groups and cycloaliphatic groups, provided that at least one of $R_1$ and $R_2$ and at least one of $R_5$ and $R_6$ is other than hydrogen, $R_4$ is selected from the group consisting of aliphatic, aromatic and cycloaliphatic groups, m is an integer from 0 to 4 and n is an integer from 1 to 7.

4. The process of claim 1 wherein the amine of (c) is said primary amine.

5. The process of claim 1 wherein the amine of (c) is said second secondary amine.

6. The process of claim 1 wherein the total pendant amine functional density of said polyamine is 2 mole percent to about 90 mole percent, and the functional density of pendant tertiary amine groups derived from said first secondary amine is about 5 to about 95 percent of the total pendant amine functional density, provided the functional density of pendant tertiary amine groups derived from said first secondary amine is at least 1 mole percent and the functional density of pendant secondary amine groups or tertiary amine groups derived from said second secondary amine is at least 1 mole percent.

7. The process of claim 1 wherein said reductive amination of (a) or (c) is conducted in the presence of a ruthenium-containing imine hydrogenation catalyst.

8. The process of claim 7 wherein said ruthenium-containing imine hydrogenation catalyst is triruthenium dodecacarbonyl.

9. The process of claim 7 wherein said reductive amination of (a) and (c) is conducted in the presence of carbon monoxide.

10. The process of claim 1 wherein said reductive amination of (a) or (c) is conducted in the presence of an alkali metal borohydride.

11. The process of claim 10 wherein said alkali metal borohydride is $NaBH(O_2CCH_3)_3$ or $NaBH_3CN$.

12. The process of claim 1 wherein said polyaldehyde of (a) is produced by contacting a polymer containing olefinic unsaturation with carbon monoxide and hydrogen in the presence of a hydroformylation catalyst.

13. The process of claim 12 wherein said polymer containing olefinic unsaturation is selected from the group consisting of polybutadiene and poly(ethylenepropylenediene monomer).

14. The process of claim 12 wherein the amount of aldehyde groups in said polyaldehyde is controlled by controlling the consumption of carbon monoxide and hydrogen during said hydroformylation.

15. The process of claim 1 wherein the amount of aldehyde groups in said poly(tertiary amine) containing a controlled amount of aldehyde groups and carbon-carbon double bonds is controlled by controlling the consumption of carbon monoxide and hydrogen during said hydroformylation of (b).

16. A process for preparing a polyamine containing a controlled amount of pendant tertiary amine groups and a controlled amount of pendant secondary amine or different tertiary amine groups comprising:

(a) contacting a polyaldehyde containing a controlled amount of pendant aldehyde groups and carbon-carbon double bonds and a first secondary amine under reductive amination conditions in the presence of (1) hydrogen and a ruthenium-containing imine hydrogenation catalyst or (2) an alkali metal borohydride, wherein the amount of said first secondary amine is selected to reductively aminate a percentage of pendant aldehyde groups in the starting polyaldehyde to produce a poly(tertiary amine) having a controlled amount of pendant tertiary amine groups, a controlled amount of pendant aldehyde groups, and a controlled amount of carbon-carbon double bonds wherein the ratio of the sum of the pendant tertiary amine groups and pendant aldehyde groups in said poly (tertiary amine) to carbon-carbon double bonds in said poly(tertiary amine) is substantially equivalent to the ratio of pendant aldehyde groups to carbon-carbon double bonds in said starting polyaldehyde, and (b) subsequently contacting said poly(tertiary amine) of (a) with a primary amine or a second secondary amine and reacting said poly(tertiary amine) of (a) and said primary amine or said second secondary amine under reductive amination conditions in the presence of (1) hydrogen and a ruthenium-containing imine hydrogenation catalyst or (2) an alkali metal borohydride to produce said polyamine having a substantially equivalent ratio of secondary amine groups derived from said primary amine or tertiary amine groups derived from said second secondary amine to carbon-carbon double bonds in said polyamine as the ratio of aldehyde groups in said poly(tertiary amine) of (a) to carbon-carbon double bonds in said poly(tertiary amine) of (a), provided that when said reductive amination of (b) is done with a primary amine in the presence of an alkali metal borohydride, said primary amine is a sterically hindered aliphatic or cycloaliphatic primary amine or an aromatic primary amine.

17. The process of claim 16 wherein said first secondary amine and said second secondary amine are represented by the formula RR'NH and said primary amine is represented by the formula $RNH_2$ wherein R and R' are independently selected from the group consisting of aliphatic, aromatic, cycloaliphatic, and substituted aliphatic, aromatic and cycloaliphatic groups provided said first secondary amine and said second secondary amine are different.

18. The process of claim 17 wherein the substituent on said substituted aliphatic, aromatic or cycloaliphatic groups is selected from the group consisting of

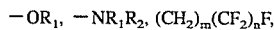

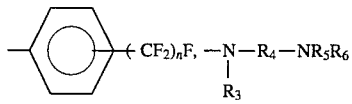

and mixtures thereof wherein $R_1$, $R_2$, $R_3$, $R_5$ and $R_6$ are independently selected from the group consisting of hydrogen, aliphatic groups, aromatic groups and cycloaliphatic groups, provided that at least one of $R_1$ and $R_2$ and at least one of $R_5$ and $R_6$ is other than hydrogen, $R_4$ is selected from the group consisting of aliphatic, aromatic and cycloaliphatic groups, m is an integer from 0 to 4 and n is an integer from 1 to 7.

19. The process of claim 16 wherein the amine of (b) is said primary amine.

20. The process of claim 16 wherein the amine of (b) is said second secondary amine.

21. The process of claim 16 wherein the total pendant amine functional density of said polyamine is 2 mole percent to about 90 mole percent, and the functional density of pendant tertiary amine groups derived from said first secondary amine is about 5 to about 95 percent of the total pendant amine functional density, provided the functional density of pendant tertiary amine groups derived from said first secondary amine is at least 1 mole percent and the functional density of pendant secondary amine groups or tertiary amine groups derived from said second secondary amine is at least 1 mole percent.

22. The process of claim 16 wherein said reductive amination of (a) or (b) is conducted in the presence of ruthenium-containing imine hydrogenation catalyst.

23. The process of claim 22 wherein said ruthenium-containing imine hydrogenation catalyst is triruthenium dodecacarbonyl.

24. The process of claim 22 wherein said reductive amination of (a) or (b) is conducted in the presence of carbon monoxide.

25. The process of claim 16 wherein said reductive amination of (a) or (b) is conducted in the presence of an alkali metal borohydride.

26. The process of claim 25 wherein said alkali metal borohydride is $NaBH(O_2CCH_3)_3$ or $NaBH_3CN$.

27. The process of claim 16 wherein said polyaldehyde of (a) is produced by contacting a polymer containing olefinic unsaturation with carbon monoxide and hydrogen in the presence of a hydroformylation catalyst.

28. The process of claim 27 wherein said polymer containing olefinic unsaturation is selected from the group consisting of polybutadiene and poly(ethylenepropylenediene monomer).

29. The process of claim 27 wherein the amount of aldehyde groups in said polyaldehyde is controlled by controlling the consumption of carbon monoxide and hydrogen during said hydroformylation.

30. The process of claim 16 wherein the ratio of moles of said first secondary amine charged to moles of —CHO groups in said starting polyaldehyde of (a) to be reductively aminated is about 1:1.

* * * * *